(12) United States Patent
Maric et al.

(10) Patent No.: US 12,363,272 B2
(45) Date of Patent: Jul. 15, 2025

(54) ELECTRONIC DEVICES WITH OPTICAL MODULES

(71) Applicant: Apple Inc., Cupertino, CA (US)

(72) Inventors: Ivan S. Maric, San Francisco, CA (US); Forrest C. Wang, Petaluma, CA (US); Jeremy C. Franklin, San Francisco, CA (US); Phil M. Hobson, Menlo Park, CA (US); Wey-Jiun Lin, Los Altos Hills, CA (US); Yoonhoo Jo, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 633 days.

(21) Appl. No.: 17/217,993

(22) Filed: Mar. 30, 2021

(65) Prior Publication Data

US 2021/0325678 A1 Oct. 21, 2021

Related U.S. Application Data

(60) Provisional application No. 63/012,816, filed on Apr. 20, 2020.

(51) Int. Cl.
*H04N 13/344* (2018.01)
*G02B 7/02* (2021.01)
(Continued)

(52) U.S. Cl.
CPC ......... *H04N 13/344* (2018.05); *H04N 9/3141* (2013.01); *G02B 7/026* (2013.01);
(Continued)

(58) Field of Classification Search
CPC .................................................. G02B 27/0006
See application file for complete search history.

(56) References Cited

U.S. PATENT DOCUMENTS 5,225,932 A * 7/1993 Wannagot .............. G02B 23/12
359/612
10,261,324 B2 4/2019 Chuang et al.
(Continued)

FOREIGN PATENT DOCUMENTS

DE 202017105948 U1 3/2018
EP 3531186 A1 8/2019

*Primary Examiner* — William Boddie
*Assistant Examiner* — Bipin Gyawali
(74) *Attorney, Agent, or Firm* — Treyz Law Group, P.C.; G. Victor Treyz; Kendall P. Woodruff

(57) ABSTRACT

A head-mounted device may have left and right optical modules that present images to a user's eyes. Each optical module may have an optical module support structure and a lens and display coupled to the optical module support structure. The head-mounted device may have a head-mounted housing that supports the optical modules. A cover on a rear face of the head-mounted housing may have a pair of openings configured to receive the left and right optical modules. The cover may have a cover layer and left and right cover layer mounting rings respectively configured to engage with the optical module support structures of the left and right optical modules. Sets of magnets in the left and right optical modules may be configured to attract corresponding left and right vision correction lenses. Gaskets may surround the lenses in the optical modules and may prevent environmental contaminant intrusion.

8 Claims, 14 Drawing Sheets

(51) Int. Cl.
*G02B 7/14* (2021.01)
*G02B 27/00* (2006.01)
*H04N 5/72* (2006.01)
*H04N 9/31* (2006.01)

(52) U.S. Cl.
CPC ............ *G02B 7/14* (2013.01); *G02B 27/0006* (2013.01); *H04N 5/72* (2013.01)

(56) References Cited

U.S. PATENT DOCUMENTS

| | | | |
|---|---|---|---|
| 10,591,736 B1 * | 3/2020 | Bristol | G02B 27/0955 |
| 12,025,809 B1 * | 7/2024 | Lin | G02B 27/0093 |
| 2012/0113092 A1 * | 5/2012 | Bar-Zeev | G06T 19/006 |
| | | | 345/419 |
| 2014/0268336 A1 | 9/2014 | Hiraide | |
| 2015/0138645 A1 | 5/2015 | Yoo et al. | |
| 2016/0210782 A1 * | 7/2016 | Thomas | G02B 27/017 |
| 2018/0067317 A1 | 3/2018 | Barton et al. | |
| 2018/0095498 A1 * | 4/2018 | Raffle | G06K 7/10297 |
| 2019/0187490 A1 * | 6/2019 | Dominguez | G02C 5/126 |
| 2019/0339523 A1 * | 11/2019 | Evans | G02B 27/017 |
| 2019/0369353 A1 | 12/2019 | Franklin et al. | |
| 2020/0033560 A1 | 1/2020 | Weber et al. | |
| 2020/0093361 A1 * | 3/2020 | Jackson | A61B 3/0075 |
| 2020/0096775 A1 | 3/2020 | Franklin et al. | |
| 2020/0310119 A1 * | 10/2020 | Lee | G02B 27/0172 |
| 2021/0132397 A1 * | 5/2021 | Stellman | G02B 27/0176 |
| 2021/0173231 A1 * | 6/2021 | Saccarelli | G02C 7/086 |
| 2022/0035171 A1 * | 2/2022 | Yamamoto | G06F 1/163 |
| 2024/0402513 A1 * | 12/2024 | Schabacker | G02C 7/02 |

\* cited by examiner

ELECTRONIC DEVICES WITH OPTICAL MODULES

This application claims the benefit of provisional patent application No. 63/012,816, filed Apr. 20, 2020, which is hereby incorporated by reference herein in its entirety.

FIELD

This relates generally to electronic devices, and, more particularly, to electronic devices such as head-mounted devices.

BACKGROUND

Electronic devices such as head-mounted devices may have displays for displaying images. The displays may be housed in optical modules. Lenses may be mounted in the optical modules. Images on the displays may be viewed through the lenses.

SUMMARY

A head-mounted device may have left and right optical modules that present images to a user's eyes. Each optical module may have an optical module support structure and a lens and display coupled to the optical module support structure. During operation, the lens of each optical module provides an image from the display of that module to an associated eye box for viewing by a user.

The head-mounted device may have a head-mounted housing that supports that optical modules. A cover on a rear face of the head-mounted housing may have a pair of openings configured to receive the left and right optical modules. The cover may have a cover layer with left and right cover layer mounting rings respectively configured to engage with the optical module support structures of the left and right optical modules.

The head-mounted device may have removable vision-correction lenses to help accommodate users desiring individualized vision correction. Sets of magnets in the left and right optical modules may be configured to attract corresponding left and right vision correction lenses.

Dust, moisture, and other environmental contaminants may be prevented from intruding into interior regions of the optical modules using gaskets. The gaskets may surround the lenses in the optical modules and may press against adjacent surfaces of the optical module support structures.

DETAILED DESCRIPTION

An electronic device such as a head-mounted device may have a front face that faces away from a user's head and may have an opposing rear face that faces the user's head. Optical modules at the rear face may be used to provide images to a user's eyes. The positions of the optical modules may be adjusted to accommodate different user interpupillary distances. The head-mounted device may have actuators and optical module guide structures to allow the optical module positions to be adjusted.

Figure 1:
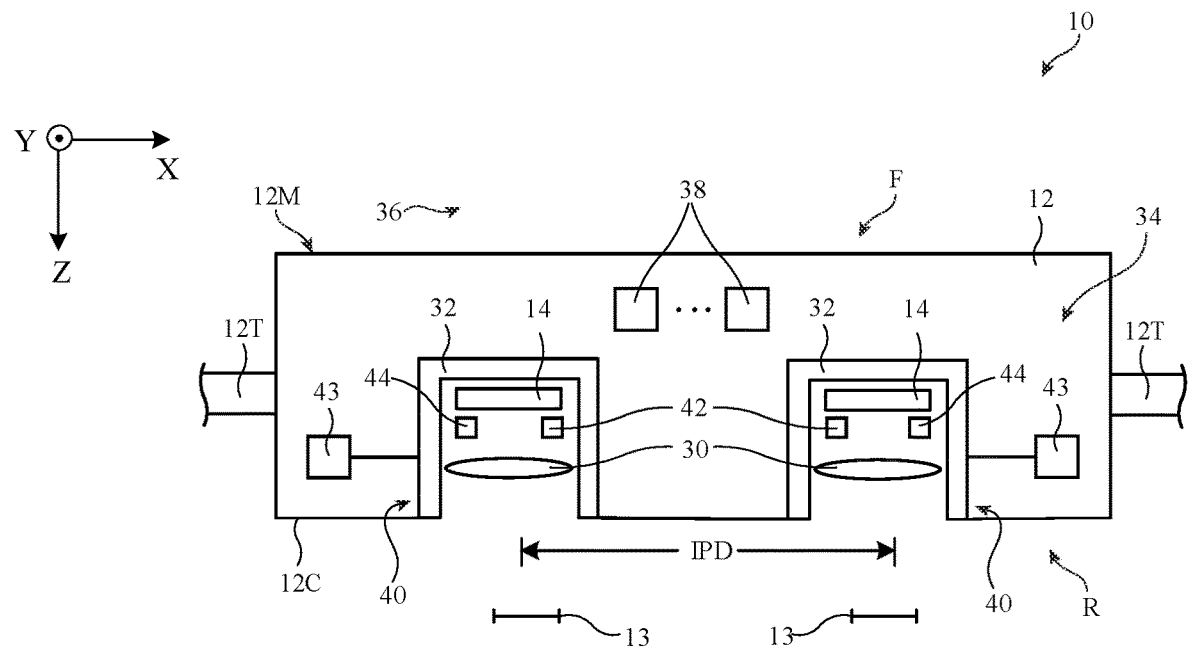
FIG. 1 is a top view of an illustrative head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. Housing portion 12M may also have internal support structures such as a frame and/or structures that perform multiple functions such as controlling airflow while providing structural support. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Not all users have the same interpupillary distance IPD. To provide device 10 with the ability to adjust the interpupillary spacing between modules 40 along lateral dimension X and thereby adjust the spacing IPD between eye boxes 13 to accommodate different user interpupillary distances, device 10 may be provided with optical module positioning systems in housing 12. The positioning systems may have guide members and actuators 43 that are used to position optical modules 40 with respect to each other.

Actuators 43 can be manually controlled and/or computer-controlled actuators (e.g., computer-controlled motors) for moving support structures (lens barrels) 32 relative to each other. Information on the locations of the user's eyes may be gathered using, for example, cameras 42. The locations of eye boxes 13 can then be adjusted accordingly.

Figure 2:
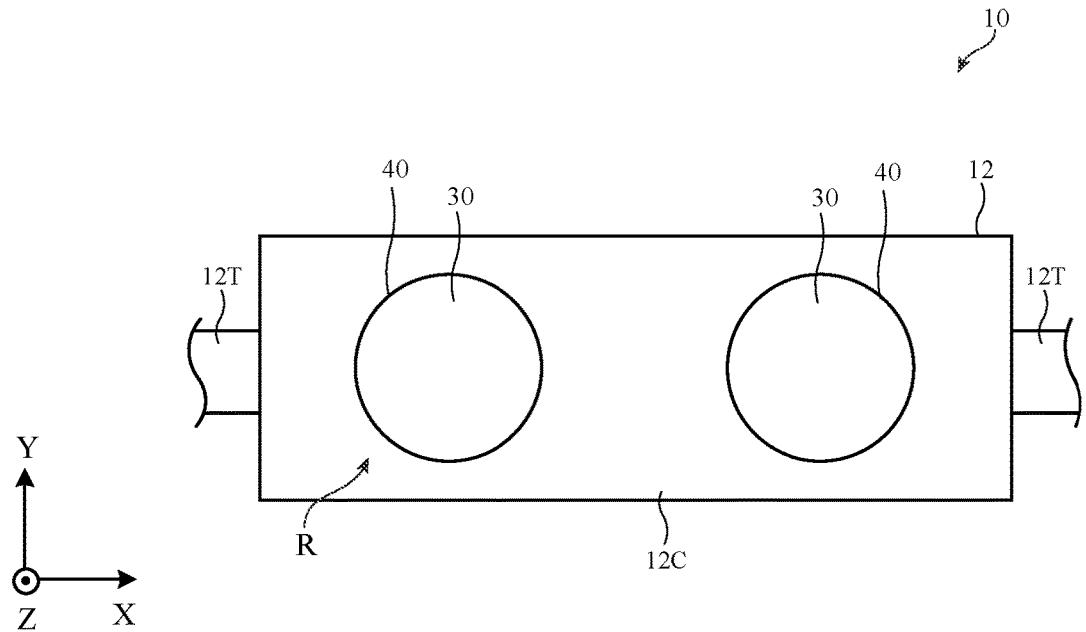
FIG. 2 is a rear view of an illustrative head-mounted device in accordance with an embodiment.

As shown in the rear view of device 10 of FIG. 2, cover 12C may cover rear face R while leaving lenses 30 of optical modules 40 uncovered (e.g., cover 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other.

Figure 3:
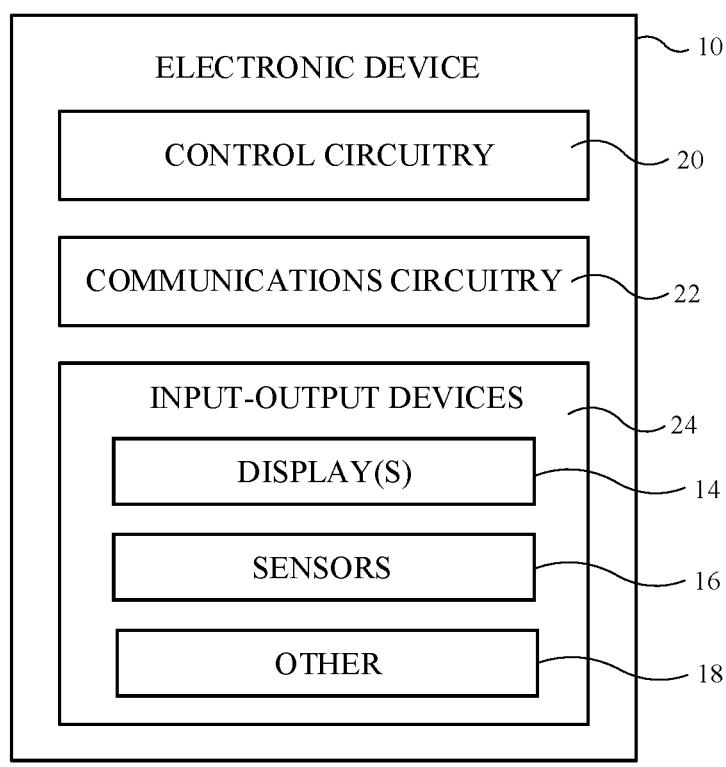
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 4:
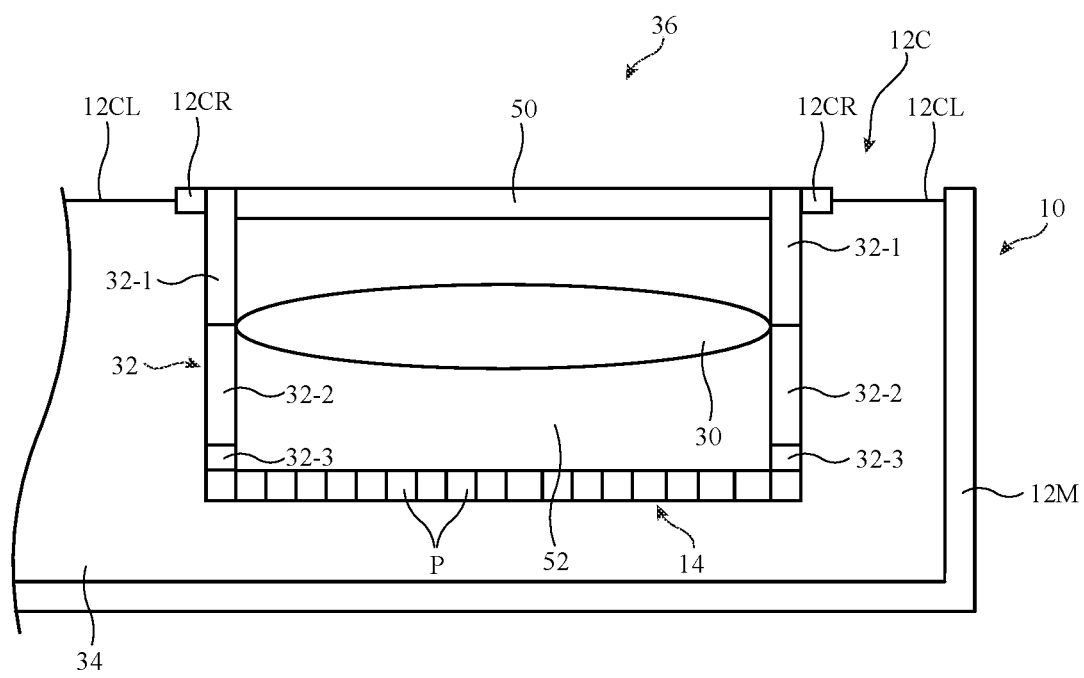
FIG. 4 is a cross-sectional view of a portion of an illustrative head-mounted device with optical modules in accordance with an embodiment.

A cross-sectional side view of a portion of device 10 is shown in FIG. 4. As shown in FIG. 4, device 10 contains optical modules such as optical module 40. Optical module support structure 32 may help support the components of optical module 40 such as display 14 and lens 30. Support structure 32 may include one or more support members formed from metal, polymer, fiber-composite material, glass, ceramic, other materials and/or combinations of these materials. In an illustrative configuration, some or all of support structure 32 is formed from black anodized aluminum to suppress stray light reflections.

Support structure(s) 32, which may sometimes be referred to as a lens barrel or optical module support structure, may receive display 14. For example, display 14 may be coupled to an opening in support structure 32. In the illustrative configuration of FIG. 4, support structure 32 include a display mounting structure such as display bezel 32-3 and display 14 is mounted to structure 32 using display bezel 32-3.

One or more support structures such as support structures 32-1 and 32-2 of FIG. 4 may receive and support lens 30. Lens 30 may be a catadioptric lens or other suitable lens. Protruding portions of lens 30 (e.g., lens tabs) may be used to mount lens 30 to structures 32-1 and/or 32-2. Structure 32-1 may sometimes be referred to as a trim ring, barrel trim ring, or lens barrel trim ring (as examples). Structure 32-2 may sometimes be referred to as a lens barrel ring, lens barrel structure, main lens barrel member, or lens barrel (as examples). Structures 32-1 and 32-2 may have ring shapes that surround lens 30.

Not all users have the same eyeglasses prescription. Accordingly, it may be desirable to provide removable individualized vision correcting lenses for each user. A user may obtain an appropriate vision correction lens (e.g., a lens that corrects the normal lens 30 in an optical module for nearsightedness or farsightedness and/or astigmatism) and, prior to use of device 10, may install this individualized corrective lens in device 10. A user may, for example, install a left vision correcting lens in a left eye module and may install a right vision correcting lens in a right eye module. In the diagram of FIG. 4, an illustrative vision correcting lens (vision correcting lens 50) is shown as being removably attached to support structure 32 (e.g., to structure 32-1) in alignment with lens 30 and display 14.

Cover 12C may include cover layer 12L and a coupling structure such as cover layer mounting ring 12CR. Cover layer mounting ring 12CR may have a ring shape that surrounds optical module 40. Cover layer 12L may be attached to cover layer mounting ring 12CR. Cover layer mounting ring 12CR may, in turn, be snapped into place or otherwise coupled to a portion of support structure 32. For example, cover 12C may be attached to support structure 32-1 of structure 32 by attaching cover layer mounting ring 12CR to support structure 32-1 using mating engagement structures (e.g., interlocking protrusions and recesses, etc.). Cover layer 12CL may be formed from a stretchable layer such as a stretchable fabric layer, a layer of elastomeric material such as silicone, or other cover layer. This may help allow cover 12C to stretch and/or otherwise move to accommodate movement of optical modules 40 to match a desired interpupillary distance.

Dust and moisture may potentially contaminate and/or damage sensitive portions of optical module 40. For example, dust on the surface of display 14 may obscure images that are being displayed on pixels P of display 14. As another example, lens 30 may include polarizers, adhesive layers, wave plates, and other optical films that are potentially sensitive to moisture. Cameras, light-emitting diodes, lens 30, and display 14 and/or other electrical components in interior 52 of optical module 40 may therefore be isolated from environmental contaminants such as dust and/or moisture using gaskets or other seals. A sealing structure may, for example, run around the inner periphery of support structure 32 between support structure 32 and the periphery of lens 30. This helps seal off interior 52 from exterior region 36 surrounding device 10.

Figure 5:
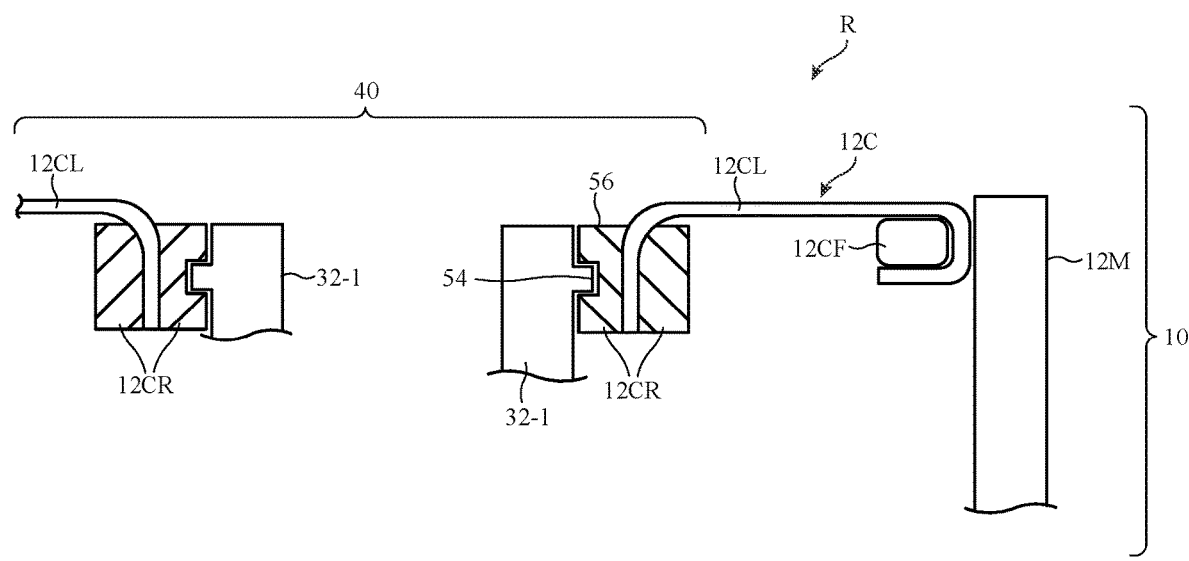
FIG. 5 is a cross-sectional side view of an illustrative rear portion of a head-mounted device with a cover in accordance with an embodiment.

FIG. 5 is a cross-sectional side view of a portion of device 10 in an illustrative configuration in which cover layer 12CL of cover 12C is attached to a frame member such as cover frame 12CF. Cover frame 12CF may, as an example, be formed from a rigid polymer member that fits within the rear of housing 12M and that has left and right openings to accommodate respective left and right optical modules 40. At the edges of device 10, cover layer 12CL may be wrapped around frame 12CF. At these edges locations, layer 12CL and frame 12CF may or may not be fixedly attached to the wall of housing portion 12M (e.g., cover 12C may float, if desired). In the middle of device 10 (e.g., the portion of device 10 adjacent to a user's nose, sometimes referred to as the nose bridge portion of device 10), cover frame 12CF may be rigidly attached to housing portion 12M (as an example).

Cover layer 12CL may have left and right openings that are aligned with and receive, respectively, left and right optical modules 40 and the lenses 30 in the left and right optical modules. Each optical module may have a cover layer mounting ring such as ring 12CR. Ring 12CR may be received within an opening in layer 12CL and may be attached to layer 12CL using adhesive, fasteners, and/or other attachment mechanisms. Ring 12CR and support 32-1 may have mating engagement structures and/or may otherwise be configured to allow ring 12CR to be mounted to support structure 32-1. For example, support 32-1 may have protrusions such as protrusions 54 and ring 12CR may have mating recesses such as recesses 56 and/or ring 12CR that allow ring 12CR to be snapped into place on support structure 32-1. In general, cover 12C (e.g., ring 12CR of cover 12C) may be attached to support structure 32-1 using adhesive, fasteners, magnets, press-fit connections, welds, and/or other attachment mechanisms. Ring 12CR may be removable by a user or may be permanently or semi-permanently attached to support structure 32-1.

Figure 6:
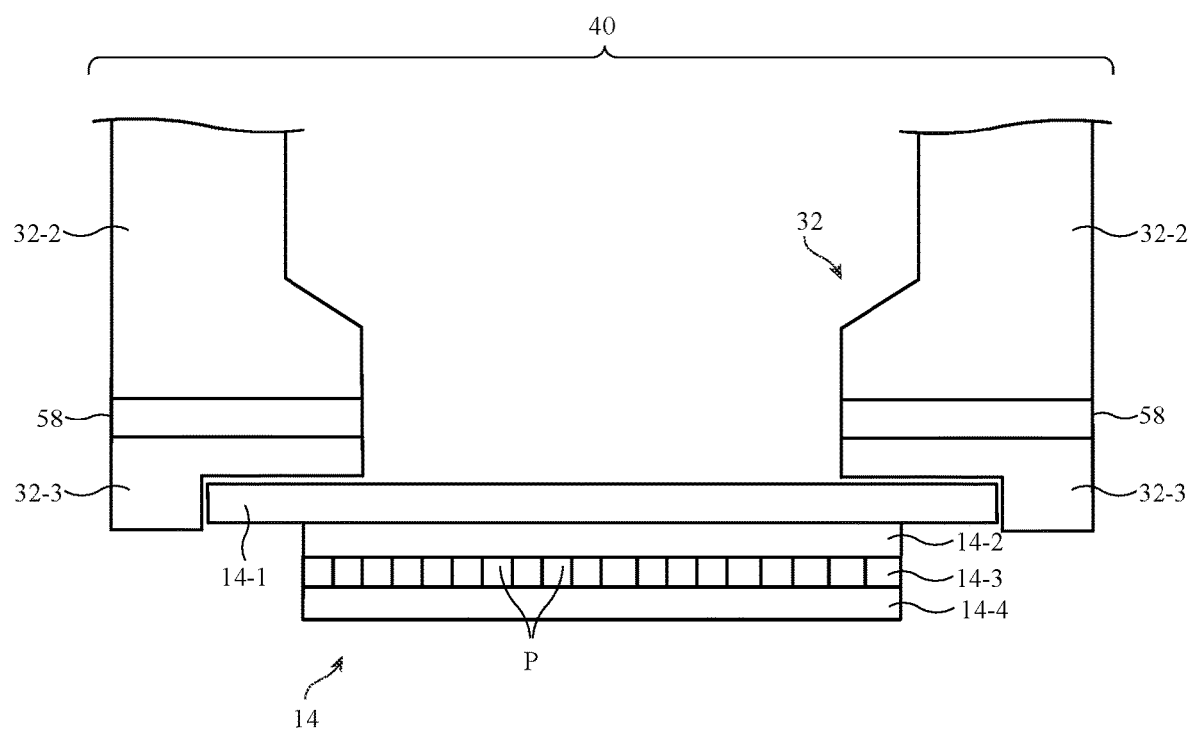
FIG. 6 is a cross-sectional side view of an illustrative optical module with a display bezel accordance with an embodiment.

FIG. 6 is a cross-sectional side view of a portion of optical module 40 showing how display 14 may be mounted to optical module 40. In the example of FIG. 6, support structure 32 includes a lens barrel portion (structure 32-2) and a display bezel portion (structure 32-3). The display bezel of optical module 40 may have a ring shape that surrounds the periphery of display 14. As shown in FIG. 6, display 14 may include display substrate 14-4. Substrate 14-4 may be, for example, a semiconductor substrate such as a silicon substrate that includes display driver circuitry, pixel circuits, and/or other circuitry for operating display 14. Pixel layer 14-3 includes pixels P that are each electrically connected a pixel circuit (e.g., a pixel circuit in layer 14-2 or a pixel circuit in substrate 14-4). Pixels P may include thin-film light-emitting diodes (e.g., organic light-emitting diodes, light-emitting diodes formed from crystalline semiconductor dies, and/or other pixel elements). Clear adhesive layer 14-2 may be used to attach the pixel array formed from pixels P to the surface of clear support layer 14-1. Clear support layer 14-1 may be formed from a transparent polymer layer, a glass layer, or other transparent supporting member (sometimes referred to as a display cover layer). Layer 14-1 of display 14 may be received within a lip in support structure 32-3 and may be attached to structure 32-3 using adhesive, fasteners, magnets, a press-fit connection, welds, and/or other attachment mechanisms. Structure 32-3 may be attached to structure 32-2 using adhesive layer 58 and/or other attachment mechanisms (fasteners, magnets, a press-fit connection, welds, etc.).

Figure 7:
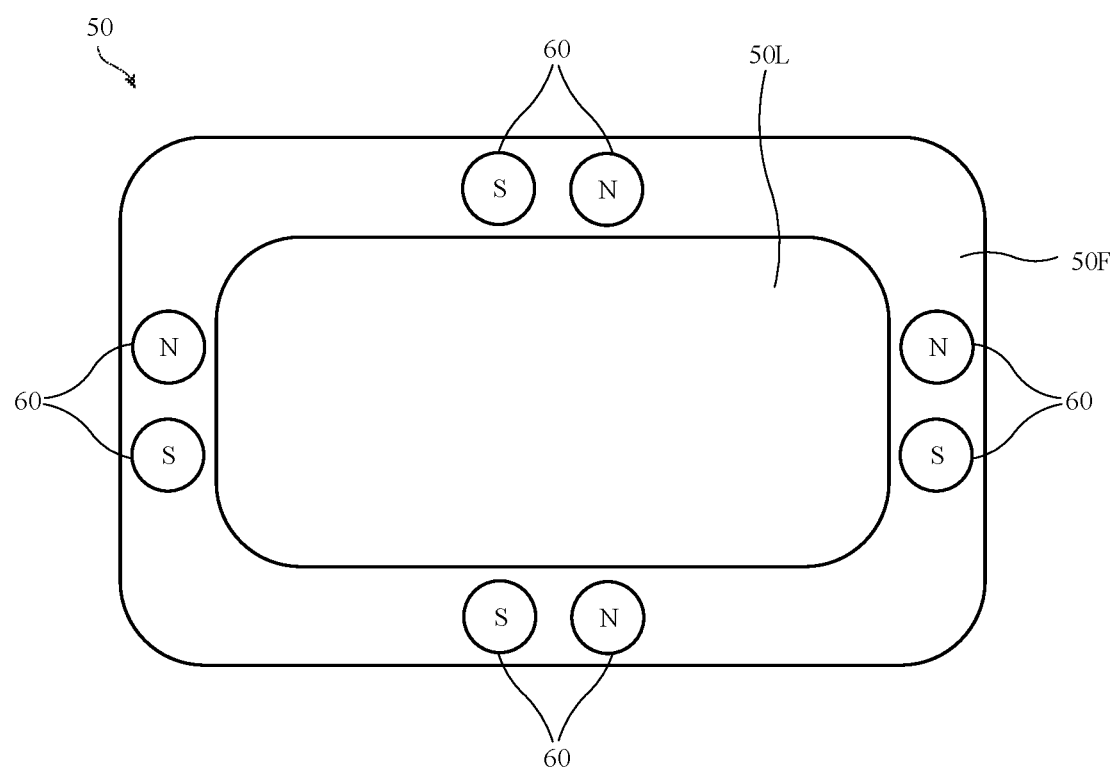
FIG. 7 is a rear view of an illustrative removable vision correction lens for an optical module in accordance with an embodiment.

FIG. 7 is a rear view of an illustrative removable vision correction lens. As shown in FIG. 7, vision correction lens 50 may have a vision correction lens frame 50F and a vision correction lens element 50L. Lens element 50L may have a positive lens power or negative lens power and/or may be configured to correct for astigmatism. Lens element 50L may be formed from molded polymer, glass, or other transparent lens material. Lens 50 may be removably attached to support structure 32 in alignment with lens 30. As an example, support structure 32-1 of optical module 40 may have magnetic structures (e.g., magnets and/or iron bars or other members formed from magnetic material). Corresponding magnetic structures (e.g. magnets and/or iron bars or other structures formed from of magnetic material) may be included in lens 50. In an illustrative configuration, the magnets of modules 40 and vision correction lenses 50 may be configured to prevent unintentional attachment of a left vision correction lens to a right optical module and vice versa.

In the example of FIG. 7, lens 50 includes magnets 60. Magnets 60 may be individual permanent magnets and/or magnet arrays. The pattern of magnet poles associated with magnets 60 (e.g., magnet polarity and magnet pole locations) may be configured to prevent misalignment of each lens 50 with respect to an associated optical module 40. For example, the pattern of magnets 60 in frame 50F of a left-hand removable lens 50 may be configured so that the left-hand removable lens 50 may only attach to the left optical module 40 of device 10 in a single predetermined rotational orientation and may not attach to the right optical module 40 of device 10 (e.g., because rotationally misalignment of the left lens 50 will cause at least some of the magnet poles of left lens 50 to repel rather than attract the corresponding magnet poles in the left optical module and because there is no alignment in which the magnets of the left lens 50 will satisfactorily all attract the magnets of the right optical module 40). The right removable lens and right optical module may likewise be provided with corresponding sets of magnets that have patterns of magnet poles that ensure satisfactory rotational alignment of right removable lens 50 with respect to right optical module 40 while preventing inadvertent attachment of the right removable lens to the left optical module. Patterns such as these may include, for example, magnets that are not symmetrically distributed around the center of lens 50 and/or that have pole patterns that differ between left and right corrective lenses 50 (e.g., magnet pole patterns that are opposite for the right and left lenses).

Figure 8:
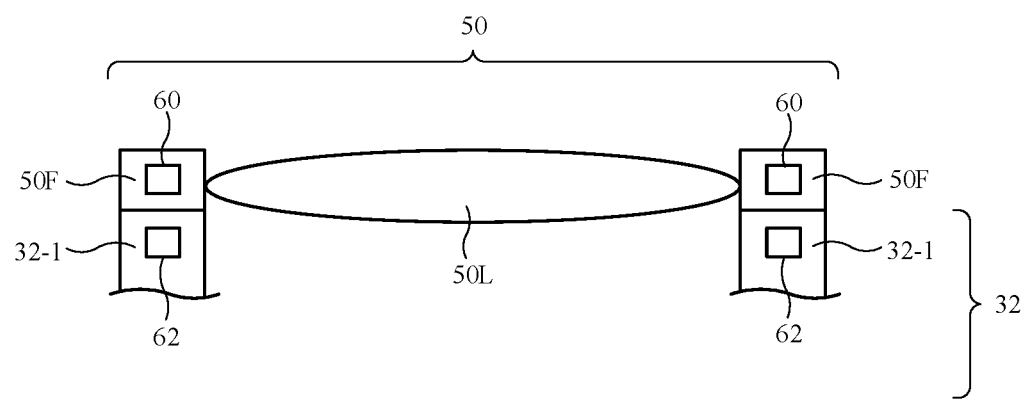
FIGS. 8 and 9 are cross-sectional side views of illustrative removable vision correction lenses removably coupled to optical module support structures in accordance with embodiments.
Figure 9:
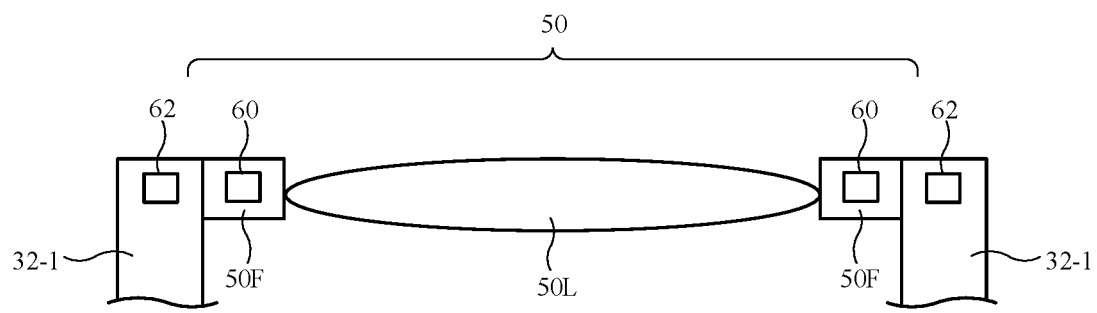

FIGS. 8 and 9 are cross-sectional side views of lens 50 and support structure 32 showing how lens 50 may be removably coupled to support structure 32 using magnets. As shown in FIGS. 8 and 9, lens 50 may have magnets 60 and support structure 32-1 of support structure 32 may have corresponding magnets 62. The poles of magnets 62 in each optical module may be configured to attract a corresponding left or right lens 50. In the example of FIG. 8, frame 50F and magnets 60 overlap magnets 62. In the example of FIG. 9, magnets 60 are radially attracted to corresponding magnets 62 in support structure 32-1. Other magnetic attachment arrangements may be used to removably attach lenses 50 to optical modules 40, if desired. Moreover, mechanical attachment mechanisms (e.g., interlocking engagement features formed from protrusions and/or recesses, etc.) and/or other attachment mechanisms (fasteners, etc.) may be used instead of and/or in combination with magnetic attachment mechanisms.

Figure 10:
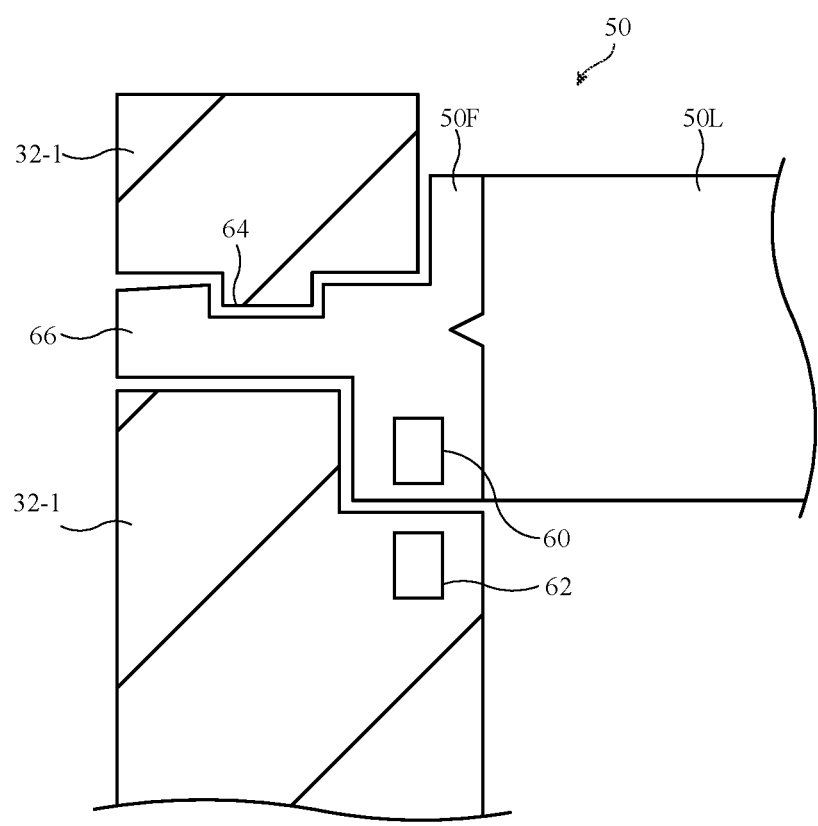
FIG. 10 is a cross-sectional view of a portion of an illustrative optical module with an opening forming an engagement structure that mates with a corresponding protrusion-shaped engagement structure of a removable vision correction lens in accordance with an embodiment.

FIG. 10 is a cross-sectional side view of an illustrative support structure and vision correction lens that have been configured to allow the vision correction lens to be removably coupled to an optical module. As shown in the example of FIG. 10, support structure 32-1 may include an opening such as opening 64 that is configured to receive protruding portion 66 of removable lens frame 50F of removable lens 50L. Opening 64 (e.g., the portions of support structure 32-1 that are configured to form opening 64) and portion 66 form interlocking engagement structures that help hold lens 50 in place on support structure 32-1. In addition to these mating engagement structures, support structure 32-1 and frame 50F may include recesses and/or other structures that receive magnets. This allows magnets 60 to be secured to frame 50F and allows magnets 62 to be secured to support structure 32-1. When lens 50 is mounted to support structure 32-1, magnets 60 of lens 50 may attract corresponding magnets 62 of support structure 32-1 to help hold lens 50 in place in support structure 32-1.

Figure 11:
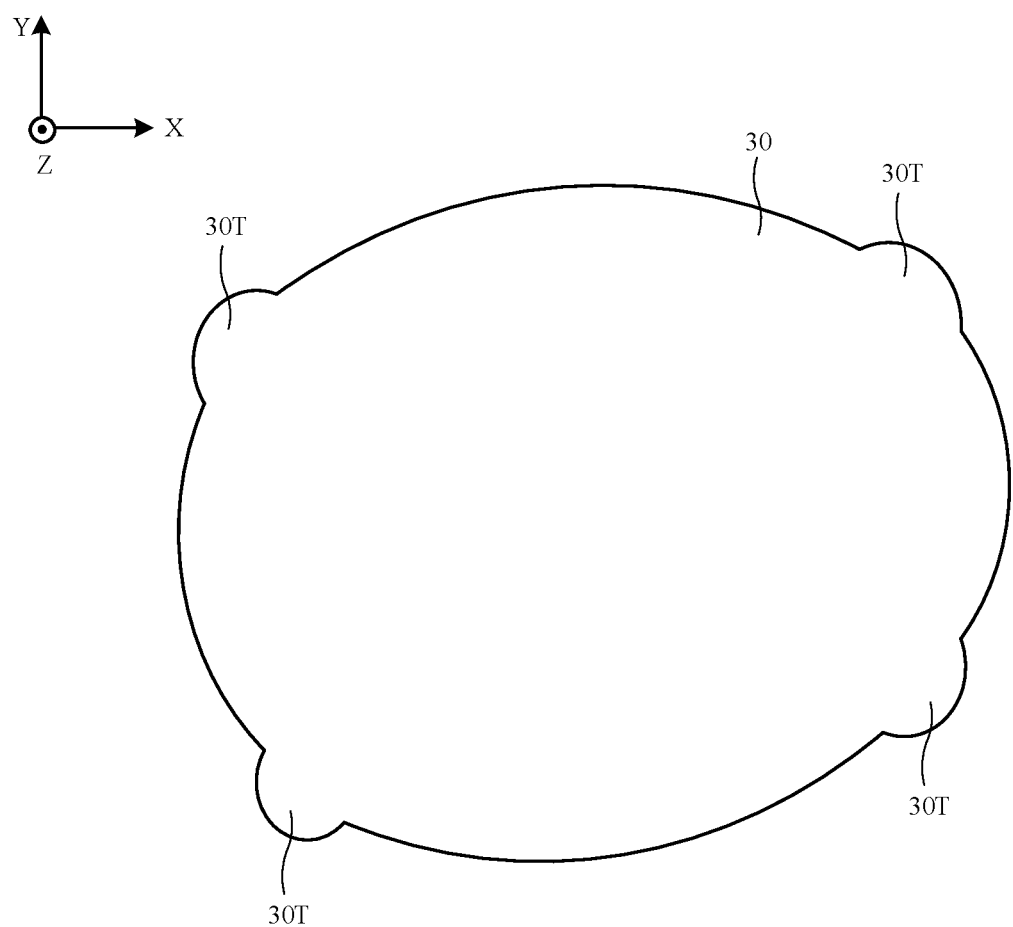
FIG. 11 is a rear view of an illustrative lens for an optical module in accordance with an embodiment.

Each optical module may have a lens such as lens 30. Lens 30 may be a catadioptric lens or other suitable lens. The outline of lens 30 may be circular, oval, rectangular, or other shape. FIG. 11 is a top view of an illustrative lens for optical module 40. As shown in FIG. 11, lens 30 may have mounting structures such as protrusions (tabs) 30T. Protrusions 30T may mate with corresponding mounting surfaces on support structure 32.

Figure 12:
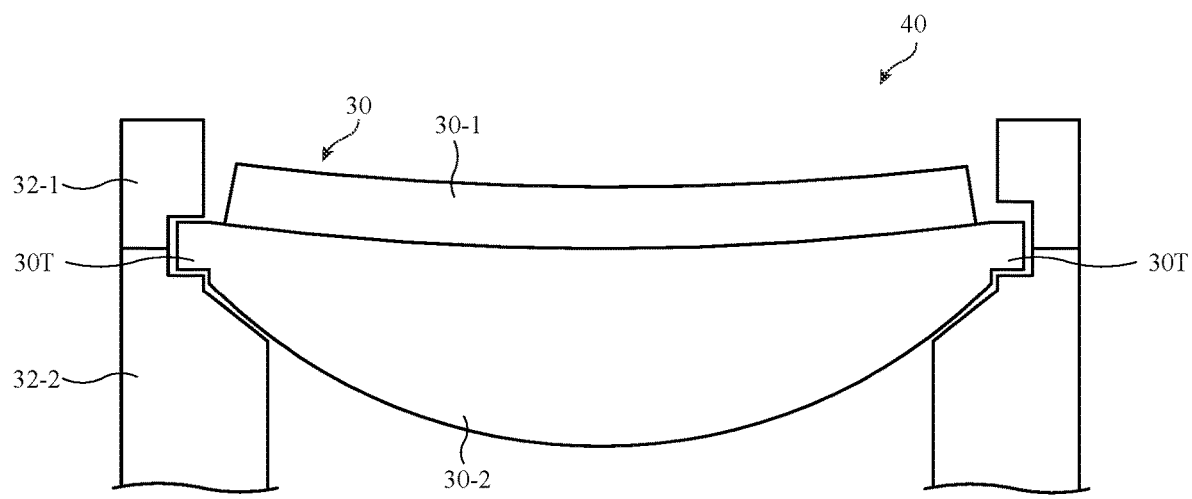
FIG. 12 is a cross-sectional view of an illustrative lens mounted in an optical module in accordance with an embodiment.

FIG. 12 is a cross-sectional side view of a portion of optical module 40 showing how protrusions 30T may, if desired, be used to mount lens 30 to support structure 32. Protrusions 30T may be captured between support structures 32-1 and 32-2 and/or may otherwise be attached to support structure 32 (e.g., using adhesive, fasteners, welds, engagement structures, etc.). Lens 30 may have multiple lens elements such as lens elements 30-1 and 30-2. The surface jointing lens elements 30-1 and 30-2 may be cylindrical or may have other surface shapes. In the example of FIG. 12, protrusions 30T have been formed as part of lens element 30-1. Protrusions 30T may be formed as part of lens element 30-2, if desired.

The exposed surfaces of lens 30 may be aspherical or may have other convex or concave surface shapes. Lens 30 may be, as an example, a catadioptric lens. In an illustrative catadioptric lens arrangement, optical films may be formed on one or both of the exposed surfaces of lens 30 and may be interposed between lens elements 30-1 and 30-2. These films may include, for example, partial mirror coatings, polarizers, adhesive layers, wave plates such as quarter wave plates, and antireflection coatings.

Figure 13:
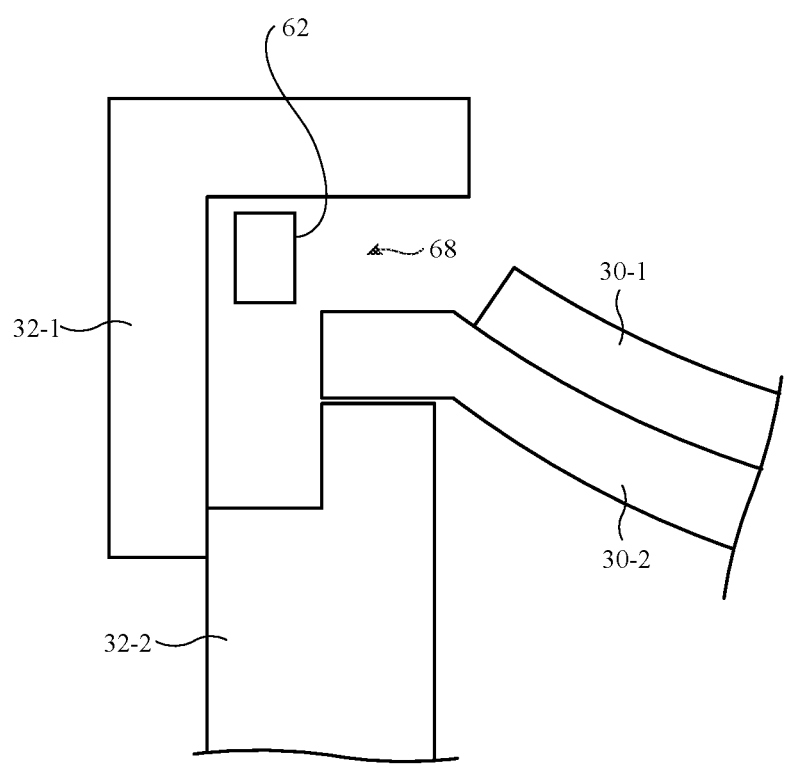
FIG. 13 is a cross-sectional view of a portion of an illustrative optical module in accordance with an embodiment.

As shown in FIG. 13, support 32-1 may be configured to form a cavity or other component mounting region such as region 68. Magnets 62 and/or other components may be mounted in region 68 (e.g., using adhesive, fasteners, etc.).

The components of optical module 40 may be sensitive to environmental contaminants. For example, the edges of the optical films on lens 30 and/or other portions of these films may be degraded when exposed to moisture, dust on the surface of display 14 (e.g., on layer 14-1 of FIG. 6) may degrade the quality of the images presented by pixels P, and environmental contaminants may adversely affect light-emitting diodes, cameras, and/or other electrical components in modules 40. The risk of environmental contaminants may be reduced by providing optical module 40 with a gasket or other sealing structure that helps seal off optical module interior region 52 (e.g., the region between lens element 30-2 and display cover layer 14-1 of display 14) from exterior region 36 surrounding device 10.

Figure 14:
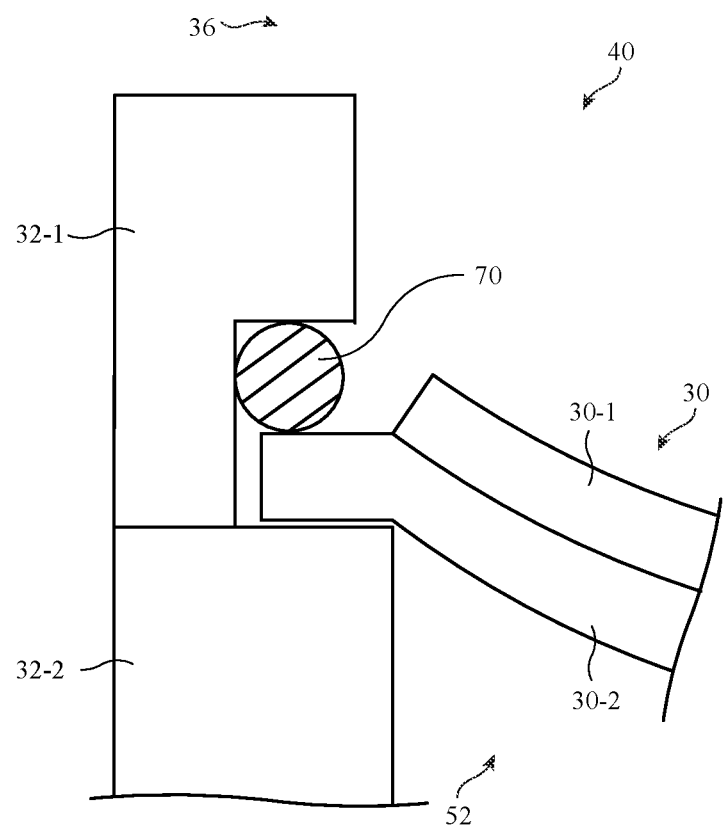
FIGS. 14, 15, and 16 are portions of illustrative optical modules with sealing structures in accordance with embodiments.

An illustrative sealing arrangement for optical module 40 is shown in FIG. 14. In the example of FIG. 14, optical module interior region 52 is sealed by ring-shaped gasket 70 (e.g., an O-ring or other ring-shaped elastomeric structure). Gasket 70 may press against peripheral portions of lens 30 (e.g., portions of lens 30 around the periphery of lens 30) and may press against opposing inwardly-facing portions of support structure 32 (e.g., portions of support structure 32-1 and/or 32-2). This may help seal off interior region 52 from exterior region 36 and thereby help prevent ingress of environmental contaminants into interior 14.

Figure 15:
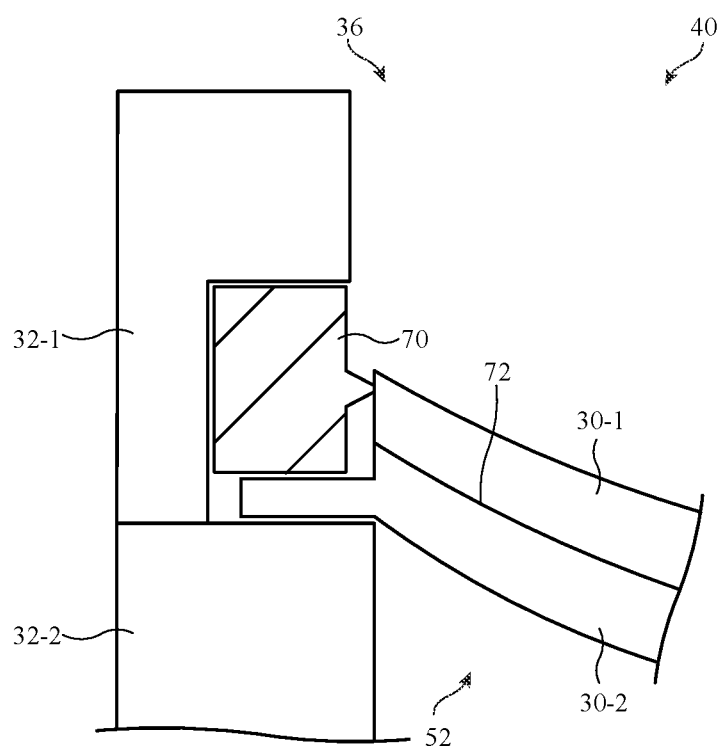
Figure 16:
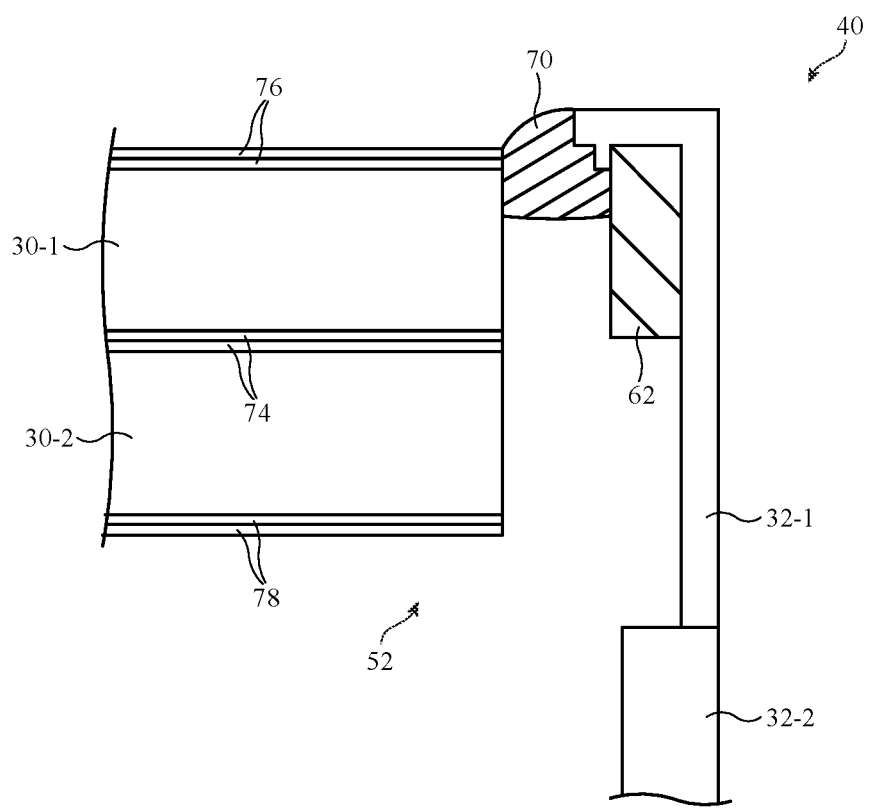

To help protect optical films on lens 30, it may be desirable to form a seal that prevents environmental contaminants from reaching the edges of these optical films. As shown in FIG. 15, for example, optical films such as a polarizer layers (e.g., a reflective polarizer), wave plate, etc. may be located at interface 72 between lens elements 30-1 and 30-2. To prevent moisture from exterior region 36 from reaching these films, gasket 70 may be configured to form a seal against a peripheral surface of lens element 30-1 as shown in FIG. 15. In the example of FIG. 16, gasket 70 has been placed at a location that protects the edges of optical films 76 on the exterior surface of lens element 30-1 as well as optical films 74 at the interface between lens elements 30-1 and 30-2 and optical films 78 on the exposed surface of element 30-2. Films 76, 74, and 78 may include antireflection layers, polarizer layers, wave plates, partial mirror coatings, adhesive layers, and/or other layers of material. In general, sealing structures such as gaskets 70 may be formed from silicone, thermoplastic urethane, or other elastomeric materials and/or may be formed from rigid polymer (e.g., cured epoxy, rigid thermoplastic materials, etc.). Gaskets 70 may be separate ring-shaped sealing members that are pressed into place between lens 30 and opposing portions of support structure 32 (e.g., support structure 32-1) during assembly, may be ring-shaped seals formed by applying a bead of liquid polymer precursor material around the perimeter of lens 30 that is subsequently cured to form rigid or elastomeric polymer using ultraviolet light, heat, etc., and/or may be formed using other suitable sealing materials.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
  a head-mounted housing; and
  optical modules coupled to the head-mounted housing, wherein the optical modules each comprise:
    an optical module support structure;
    a display coupled to the optical module support structure;
    a lens coupled to the optical module support structure that is configured to provide an image from the display to an eye box; and
    a ring-shaped sealing structure within the optical module support structure, wherein the ring-shaped sealing structure presses against a peripheral edge of the lens and presses against an inner surface of the optical module support structure to prevent environmental contaminant ingress into an interior optical module region between the display and the lens.

2. The head-mounted device defined in claim 1 wherein each optical module comprises a magnet.

3. The head-mounted device defined in claim 1 wherein each optical module support structure has a portion configured to receive a respective cover layer mounting ring.

4. The head-mounted device defined in claim 1 wherein the optical modules include left and right optical modules, the head-mounted device further comprising:
  a cover comprising:
    a cover layer with a first opening configured to receive the left optical module and a second opening configured to receive the right optical module;
    a left cover layer mounting ring that is coupled to the cover layer and that surrounds the first opening; and
    a right cover layer mounting ring that is coupled to the cover layer and that surrounds the second opening, wherein the optical module support structure in the left optical module has first engagement structures configured to couple to the left cover layer mounting ring and wherein the optical module support structure in the right optical module has second engagement structures configured to couple to the right cover layer mounting ring.

5. The head-mounted device defined in claim 1 wherein each optical module comprises a magnet configured to attract a corresponding magnet in a corresponding removable vision correction lens, wherein the optical modules and removable vision correction lenses have mating engagement structures, and wherein each optical module support structure has a portion configured to receive a cover layer mounting ring.

6. The head-mounted device defined in claim 5 wherein each optical module support structure has a first ring-shaped member and a second ring-shaped member, wherein the lens in each optical module comprises protrusions that are received between the first ring-shaped member and the second ring-shaped member of that optical module, and wherein the engagement structures of each optical module comprise an opening in the first ring-shaped member of that optical module that receives a mating engagement structure formed from a protrusion in the corresponding removable vision correction lens attracted to the magnet of that optical module.

7. The head-mounted device defined in claim 1 wherein each optical module comprises multiple magnets configured to mate with corresponding magnets in a respective vision correction lens.

8. The head-mounted device defined in claim 7 further comprising right and left vision correction lenses, wherein the optical modules comprise:
  a right optical module with a first set of magnets configured to attract the right vision correction lens and to not attract the left vision correction lens; and
  a left optical module with a second set of magnets that is different than the first set of magnets and that is configured to attract the left vision correction lens and not the right vision correction lens.

* * * * *